US007258613B2

(12) United States Patent
Lucchesi et al.

(10) Patent No.: US 7,258,613 B2
(45) Date of Patent: Aug. 21, 2007

(54) GAMING DEVICE HAVING CHANGED OR GENERATED PLAYER STIMULI

(75) Inventors: Matthew Lucchesi, Reno, NV (US); Jason D. Kremer, Reno, NV (US)

(73) Assignee: IGT, Reno, NV (US)

( * ) Notice: Subject to any disclaimer, the term of this patent is extended or adjusted under 35 U.S.C. 154(b) by 36 days.

(21) Appl. No.: 10/841,014

(22) Filed: May 7, 2004

(65) Prior Publication Data

US 2004/0209685 A1 Oct. 21, 2004

Related U.S. Application Data

(63) Continuation of application No. 09/686,244, filed on Oct. 11, 2000, now Pat. No. 6,739,973.

(51) Int. Cl.
*A63F 13/00* (2006.01)

(52) U.S. Cl. ............................ 463/35; 463/16; 463/17; 463/18; 463/19; 463/20; 463/30; 463/31; 463/32; 463/33; 463/34; 273/138.1; 273/143 R; 273/269; 273/292

(58) Field of Classification Search ............ 463/16–20, 463/30–35; 273/138.1, 143 R, 269, 292, 273/459–461
See application file for complete search history.

(56) References Cited

U.S. PATENT DOCUMENTS 3,831,172 A 8/1974 Olliges et al.
4,300,225 A 11/1981 Lambl
4,314,236 A 2/1982 Mayer et al.
4,339,798 A 7/1982 Hedges et al.
4,344,345 A 8/1982 Sano (Continued)

FOREIGN PATENT DOCUMENTS

EP 0 978 809 A2 2/2000

(Continued)

OTHER PUBLICATIONS

"Silicon's Odyssey catching on fast" Associated Press. Las Vegas Review—Journal, (May 26, 1997), pp. 3D.*

(Continued)

*Primary Examiner*—Robert E Pezzuto
*Assistant Examiner*—David Duffy
(74) *Attorney, Agent, or Firm*—Bell, Boyd & Lloyd, LLP

(57) ABSTRACT

A gaming device having at least one changed or generated player stimulus and a method of changing or generating at least one player stimulus of a gaming device are disclosed for enhancing a player's interest, excitement, length of play, and enjoyment of the gaming device. The gaming device comprises at least one input device. A number or duration of activations of the input device is monitored and temporarily stored by a processor. The processor is capable of generating or changing at least one player stimulus or combinations thereof after a predetermined or random number of activations has been input into the gaming device or after a predetermined period of time the input mechanism has been activated. Further, the gaming device comprises of-at least one reset mechanism connected to the processor capable of resetting the gaming device for the generation of another gaming experience while a player is operating the device.

24 Claims, 4 Drawing Sheets

U.S. PATENT DOCUMENTS

| | | | |
|---|---|---|---|
| 4,363,482 | A | 12/1982 | Goldfarb |
| RE31,441 | E | 11/1983 | Nutting et al. |
| 4,496,149 | A | 1/1985 | Schwartzberg |
| 4,582,324 | A | 4/1986 | Koza et al. |
| 4,618,150 | A | 10/1986 | Kimura |
| 4,624,459 | A | 11/1986 | Kaufman |
| 4,660,107 | A | 4/1987 | Chippendale, Jr. |
| 4,695,053 | A | 9/1987 | Vazquez, Jr. et al. |
| 4,712,189 | A | 12/1987 | Mohri |
| 4,732,386 | A | 3/1988 | Rayfiel |
| 4,733,593 | A | 3/1988 | Rothbart |
| 4,791,558 | A | 12/1988 | Chaitin et al. |
| 4,876,937 | A | 10/1989 | Suzuki |
| 4,961,575 | A | 10/1990 | Perry |
| 4,974,483 | A | 12/1990 | Luzzatto |
| 4,974,857 | A | 12/1990 | Beall et al. |
| 5,046,735 | A | 9/1991 | Hamano et al. |
| 5,096,195 | A | 3/1992 | Gimmon |
| 5,119,465 | A | 6/1992 | Jack |
| 5,179,517 | A | 1/1993 | Sarbin et al. |
| 5,221,801 | A | 6/1993 | Bruti et al. |
| 5,223,828 | A | 6/1993 | McKiel, Jr. |
| 5,242,163 | A | 9/1993 | Fulton |
| 5,258,574 | A | 11/1993 | Kawano |
| 5,266,736 | A | 11/1993 | Saito |
| 5,275,400 | A | 1/1994 | Weingardt et al. |
| 5,287,102 | A | 2/1994 | McKiel, Jr. |
| 5,331,112 | A | 7/1994 | Sato et al. |
| 5,342,047 | A | 8/1994 | Heidel et al. |
| 5,371,345 | A | 12/1994 | LeStrange et al. |
| 5,390,938 | A | 2/1995 | Takeya |
| 5,393,061 | A | 2/1995 | Manship et al. |
| 5,393,070 | A | 2/1995 | Best |
| 5,429,507 | A | 7/1995 | Kaplan |
| 5,430,835 | A | 7/1995 | Williams et al. |
| 5,446,902 | A | 8/1995 | Islam |
| 5,449,173 | A | 9/1995 | Thomas et al. |
| 5,469,511 | A | 11/1995 | Lewis et al. |
| 5,470,233 | A | 11/1995 | Fruchterman et al. |
| 5,472,197 | A | 12/1995 | Gwiasda et al. |
| 5,508,699 | A | 4/1996 | Silverman |
| 5,515,764 | A | 5/1996 | Rosen |
| 5,577,253 | A | 11/1996 | Blickstein |
| 5,606,144 | A | 2/1997 | Dabby |
| 5,625,845 | A | 4/1997 | Allran |
| 5,668,996 | A | 9/1997 | Radinsky |
| 5,695,188 | A | 12/1997 | Ishibashi |
| 5,697,843 | A | 12/1997 | Manship et al. |
| 5,703,310 | A | 12/1997 | Kurakake et al. |
| 5,707,286 | A | 1/1998 | Carlson |
| 5,715,459 | A | 2/1998 | Celi |
| 5,745,761 | A | 4/1998 | Celi |
| 5,745,762 | A | 4/1998 | Celi |
| 5,758,875 | A | 6/1998 | Giacalone, Jr. |
| 5,762,552 | A | 6/1998 | Vuong et al. |
| 5,766,074 | A | 6/1998 | Cannon et al. |
| 5,772,509 | A | 6/1998 | Weiss |
| 5,778,231 | A | 7/1998 | Van Hoff |
| 5,792,972 | A | 8/1998 | Houston |
| 5,802,364 | A | 9/1998 | Senator |
| 5,807,172 | A | 9/1998 | Piechowiak |
| 5,809,303 | A | 9/1998 | Senator |
| 5,833,538 | A | 11/1998 | Weiss |
| 5,839,958 | A | 11/1998 | Ozarow |
| 5,848,932 | A | 12/1998 | Adams |
| 5,854,927 | A | 12/1998 | Gelissen |
| 5,876,284 | A | 3/1999 | Acres et al. |
| 5,880,386 | A | 3/1999 | Wachi et al. |
| 5,889,990 | A | 3/1999 | Coleman |
| 5,892,171 | A | 4/1999 | Ide |
| 5,902,184 | A | 5/1999 | Bennett et al. |

| | | | | |
|---|---|---|---|---|
| 5,908,354 | A | 6/1999 | Okuniewicz | |
| 5,910,048 | A | 6/1999 | Feinberg | |
| 5,911,071 | A | 6/1999 | Jordan | |
| 5,920,720 | A | 7/1999 | Toutonghi | |
| 5,920,842 | A | 7/1999 | Cooper et al. | |
| 5,923,878 | A | 7/1999 | Marsland | |
| 5,923,880 | A | 7/1999 | Rose | |
| 5,930,509 | A | 7/1999 | Yates | |
| 5,937,193 | A | 8/1999 | Evoy | |
| 5,946,487 | A | 8/1999 | Dangelo | |
| 5,946,489 | A | 8/1999 | Yellin | |
| 5,964,843 | A | 10/1999 | Eisler | |
| 5,966,535 | A | 10/1999 | Benedikt | |
| 5,967,894 | A | 10/1999 | Kinoshita et al. | |
| 5,970,249 | A | 10/1999 | Holze | |
| 5,978,585 | A | 11/1999 | Crelier | |
| 5,997,401 | A | 12/1999 | Crawford | |
| 5,999,731 | A | 12/1999 | Yellin | |
| 6,003,038 | A | 12/1999 | Chen | |
| 6,015,346 | A | 1/2000 | Bennett | |
| D421,277 | S | 2/2000 | McGahn et al. | |
| 6,021,272 | A | 2/2000 | Cahill | |
| 6,021,273 | A | 2/2000 | Criesemer | |
| 6,026,238 | A | 2/2000 | Bond | |
| 6,029,000 | A | 2/2000 | Woosley | |
| 6,031,993 | A | 2/2000 | Andrews | |
| 6,035,120 | A | 3/2000 | Ravichandran | |
| 6,052,527 | A | 4/2000 | Delcourt et al. | |
| 6,056,642 | A | 5/2000 | Bennett | |
| 6,062,979 | A | 5/2000 | Inoue | |
| 6,066,181 | A | 5/2000 | DeMaster | |
| 6,071,192 | A | 6/2000 | Weiss | |
| 6,074,432 | A | 6/2000 | Guccione | |
| 6,075,940 | A | 6/2000 | Gosling | |
| 6,084,169 | A | 7/2000 | Hasegawa et al. | |
| 6,089,976 | A | 7/2000 | Schneider et al. | |
| 6,089,978 | A | 7/2000 | Adams | |
| 6,092,147 | A | 7/2000 | Levy | |
| 6,096,095 | A | 8/2000 | Halstead | |
| 6,102,400 | A | 8/2000 | Scott et al. | |
| 6,103,964 | A | 8/2000 | Kay | |
| 6,106,393 | A | 8/2000 | Sunaga et al. | |
| 6,110,041 | A | 8/2000 | Walker et al. | |
| 6,110,043 | A | 8/2000 | Olsen | |
| 6,110,226 | A | 8/2000 | Bothner | |
| 6,113,495 | A | 9/2000 | Walker | |
| 6,117,009 | A | 9/2000 | Yoseloff | |
| 6,126,165 | A | 10/2000 | Sakamoto | |
| 6,131,191 | A | 10/2000 | Cierniak | |
| 6,138,273 | A | 10/2000 | Sturges | |
| 6,141,794 | A | 10/2000 | Dice | |
| 6,142,875 | A | 11/2000 | Kodachi et al. | |
| 6,146,273 | A | 11/2000 | Olsen | |
| 6,146,276 | A | 11/2000 | Okuniewicz | |
| 6,155,925 | A | 12/2000 | Giobbi et al. | |
| 6,159,097 | A | 12/2000 | Gura | |
| 6,174,233 | B1 | 1/2001 | Sunaga et al. | |
| 6,174,235 | B1 | 1/2001 | Walker et al. | |
| 6,175,632 | B1 | 1/2001 | Marx | |
| 6,198,395 | B1 | 3/2001 | Sussman | |
| 6,217,448 | B1 | 4/2001 | Olsen | |
| 6,233,731 | B1 | 5/2001 | Bond et al. | |
| 6,238,288 | B1 | 5/2001 | Walker et al. | |
| 6,241,612 | B1 | 6/2001 | Heredia | |
| 6,254,481 | B1 | 7/2001 | Jaffe | |
| 6,270,409 | B1 * | 8/2001 | Shuster | 463/20 |
| 6,270,411 | B1 | 8/2001 | Gura et al. | |
| 6,293,869 | B1 | 9/2001 | Kwan et al. | |
| 6,295,638 | B1 | 9/2001 | Brown et al. | |
| 6,302,790 | B1 | 10/2001 | Brossard | |
| 6,306,034 | B1 | 10/2001 | Sakamoto et al. | |
| 6,309,299 | B1 | 10/2001 | Weiss | |
| 6,309,301 | B1 | 10/2001 | Sano | |

| | | | | |
|---|---|---|---|---|
| 6,311,982 | B1 | 11/2001 | Lebensfeld et al. | |
| 6,321,323 | B1 | 11/2001 | Nugroho et al. | |
| 6,328,648 | B1 | 12/2001 | Walker et al. | |
| 6,390,923 | B1 | 5/2002 | Yoshitomi et al. | |
| 6,409,596 | B1 | 6/2002 | Hayashida et al. | |
| 6,416,411 | B1 * | 7/2002 | Tsukahara | 463/35 |
| 6,504,089 | B1 | 1/2003 | Negishi et al. | |
| 6,516,466 | B1 | 2/2003 | Jackson | |
| 6,537,152 | B2 | 3/2003 | Seelig et al. | |
| 6,544,122 | B2 | 4/2003 | Araki et al. | |
| 6,554,703 | B1 | 4/2003 | Bussick et al. | |
| 6,561,908 | B1 | 5/2003 | Hoke | |
| 6,599,195 | B1 | 7/2003 | Araki et al. | |
| 6,638,169 | B2 | 10/2003 | Wilder et al. | |
| 6,656,046 | B1 | 12/2003 | Yoseloff et al. | |
| 6,729,618 | B1 | 5/2004 | Koenig et al. | |
| 6,739,973 | B1 | 5/2004 | Lucchesi et al. | |
| 6,769,985 | B1 | 8/2004 | Laakso et al. | |
| 6,810,517 | B2 | 10/2004 | Bond et al. | |
| 6,848,996 | B2 | 2/2005 | Hecht et al. | |
| 6,935,955 | B1 | 8/2005 | Kaminkow et al. | |
| 2001/0029542 | A1 | 10/2001 | Nishimura | |
| 2002/0077165 | A1 | 6/2002 | Bansemer et al. | |
| 2002/0090990 | A1 | 7/2002 | Koenig et al. | |
| 2002/0109718 | A1 | 8/2002 | Mansour et al. | |
| 2003/0064798 | A1 | 4/2003 | Grauzer et al. | |
| 2003/0064808 | A1 | 4/2003 | Hecht et al. | |
| 2003/0073489 | A1 | 4/2003 | Hecht et al. | |
| 2003/0073490 | A1 | 4/2003 | Hecht et al. | |
| 2003/0073491 | A1 | 4/2003 | Hecht et al. | |
| 2004/0053695 | A1 | 3/2004 | Mattice et al. | |
| 2004/0063489 | A1 | 4/2004 | Crumby | |
| 2004/0142739 | A1 | 7/2004 | Loose et al. | |
| 2004/0142747 | A1 | 7/2004 | Pryzby | |
| 2004/0209685 | A1 | 10/2004 | Lucchesi et al. | |
| 2005/0043090 | A1 | 2/2005 | Pryzby et al. | |
| 2005/0054440 | A1 | 3/2005 | Anderson et al. | |
| 2005/0054442 | A1 | 3/2005 | Anderson et al. | |
| 2005/0064935 | A1 | 3/2005 | Blanco | |
| 2005/0277469 | A1 | 12/2005 | Pryzby et al. | |
| 2005/0282631 | A1 | 12/2005 | Bonney et al. | |
| 2006/0073881 | A1 | 4/2006 | Pryzby et al. | |

FOREIGN PATENT DOCUMENTS

| | | | |
|---|---|---|---|
| EP | 0 997 856 | A2 | 5/2000 |
| EP | 0 997 857 | A2 | 5/2000 |
| EP | 1 079 345 | A1 | 2/2001 |
| EP | 1 225 565 | A2 | 7/2002 |
| EP | 1439507 | A3 | 3/2005 |
| GB | 2 201 279 | A | 8/1988 |
| JP | 11197292 | A | 12/1997 |
| JP | 411216221 | A | 8/1999 |
| JP | 2000107466 | A | 4/2000 |
| JP | 02000296209 | A | 10/2000 |
| JP | 2001062029 | A | 3/2001 |
| JP | 2003290422 | A | 10/2003 |
| WO | WO 2005113089 | | 12/2005 |
| WO | WO2005113091 | | 12/2005 |
| WO | WO 2005114598 | | 12/2005 |
| WO | WO 2005117647 | | 12/2005 |
| WO | WO 2005120127 | | 12/2005 |
| WO | WO2006017036 | A1 | 2/2006 |
| WO | WO2006017445 | A2 | 2/2006 |

OTHER PUBLICATIONS

Article, "Monopoly Movers & Shakers Williams/WMS Gaming," published by Strictly Slots publication in Jul. 2000.
Brochure of IGT, "Run for Your Money S-Plus Limited," published in the year 1998 on or before December thereof.
Brochure of IGT, "Top Dollar S-Plus Limited," published in the year 1998 on or before December thereof.
Brochure of IGT, "Wheel of Fortune," published in the year 1998 on or before December thereof.
Brochure of WMS Gaming Inc., "Monopoly Chairman of the Board," published by Hasbro, Inc. in the year 1999 on or before December thereof.
Brochure of WMS Gaming Inc., "Monopoly Once Around," published by Hasbro, Inc. in the year 1998 on or before December thereof.
Brochure of WMS Gaming Inc., "Monopoly Reel Estate," published by Hasbro, Inc. in the year 1998 on or before December thereof.
Description of Accelerated Credit Roll-Up in Gaming Machines written by IGT, available in the year 1999 on or before December thereof.
Description of Action Prompts in Gaming Machines, written by IGT, available in the year 1999 on or before December thereof.
Description of Lighting Features in Gaming Machines, written by IGT, available in the year 1999 on or before December thereof.
Description of Maximum Wager Sound and Bet Sounds in Gaming Devices written by IGT, available in the year 2000 on or before December thereof.
Description of Volume Control Functions in Gaming Machines written by IGT, available in the year 1999 on or before December thereof.
Press Release, "WMS Gaming's Monopoly Slot Machines Named 1998's Most Innovative Gaming Product At The American Gaming, Lodging and Leisure Summit," published by WMS Gaming Inc. on Jan. 13, 1999.
Article, "A Salute to Game Shows-The Price Is Right-Pricing Games-Three Strikes," p. 8 of 9, online, retrieved on Aug. 16, 2000. Retrieved from the Internet: <http://ben-schumin.simplenet.com/game-shows/shows/price-is-right/pricing-games-4.htm>.
Article, "Frankie & Annette's Beach Party Bally Gaming," published by Strictly Slots, Dec. 2001.
Article, "Megaman X's Soundcard History Museum," pp. 1-5, retrieved on May 11, 2000 on Internet at http://digitalparadise.cgocable.ca/MegaMan_X/Soundcards.
Article, "Microprocessor Report," pp. 2, 12-17, published by Micro Design Resources on Mar. 25, 1996.
Brochure of Bally Gaming, Inc., "EVO HYBRID Frankie & Annette's Beach Party," published by Bally Gaming, Inc. in the year 2001 on or before December thereof.
Brochure of Bally Gaming, Inc., "Frankie & Annette's Beach Party (EVO Hybrid)," http://www.ballygaming.com/gameroom/games.asp?gameID=664, Jan. 9, 2004.
Brochure of IGT, "Elephant King," http://www.igt.com/games/new_games/elephant.html, Mar. 21, 2001.
Brochure of IGT, "Leopard Spots, Double Diamond 2000, Little Green Men, Elephant King, I Dream of Jeannie," available in Oct. 1999.
Brochure of IGT, "Totem Pole," written by IGT, available in the year 1997, on or before December thereof.
Brochure of WMS Gaming Inc., "Meet the Next Generation of Monopoly Slot Machines from WMS Gaming!" published by Hasbro, Inc. in the year 1999 on or before December thereof.
Brochure of WMS Gaming Inc., "Movers & Shakers," published by Hasbro, Inc. in the year 2000 on or before December thereof.
Chutes and Ladders CD-ROM Game, Hasbro Interactive, Inc., available in the year 1999 on or before December thereof.
Description of Last Sound in Credit Roll-Up in Gaming Machines written by IGT, available in the year 2000 on or before December thereof.
Description of Payout Sound Feature in Gaming Machine written by IGT, available in the year 1999 on or before December thereof.
Description of Progressive Sound Feature in Pinball and Video Games written by IGT, available in the year 1999 on or before December thereof.
Description of Sound Effects in Gaming Devices written by IGT, available in the year 2000 on or before December thereof.
Description of Sound Feature in Totem Pole™ Gaming Machine written by IGT, available in the year 1997 on or before December thereof.

Description of Tempo Change In Gaming Machines written by IGT, available in the year 2000 on or before December thereof.
Description of Verbal Wager Feature in "Dick Clark" Gaming Machine written by IGT, available in the year 2000 on or before December thereof.
MIDI Media Adaptation Layer for IEEE-1394, published by the Association of Musical Electronics Industry in Tokyo, Japan and The MIDI Manufacturers Association in Los Angeles, California, Nov. 30, 2000, pp. 1-17.
Press Release by Ian Fried of CNET News.com, "Microsoft Releases XP for Slot Machines," file://C:WINDOW . . . \Microsoft releases XP for slot machines—Tech News—CNET.com.htm., Nov. 28, 2001, pp. 1-2.
Screen Shot and Description by IGT of "Free Spins Bonus (Elephant King)" written by IGT, available in Oct. 1999.
Screen Shots of "Race Car Bonus Feature" written by IGT, available in the year 1998 on or before December thereof.
The Java™ Tutorial, "What Can Java Technology Do?" http://java.sun.com/docs/books/tutorial/getStarted/i.../definition.htm, Oct. 16, 2000, pp. 1-2.
The MIDI File Format, http://crystal.capana.org.au/ghansper/midi_introduction/midi_file_format.html, Dec. 28, 2001, pp. 1-10.
Definition of Pitch, Merriam-Webster's Collegiate Dictionary, Tenth Edition, p. 886, 1999, on or before December thereof.
"Description of Incorrect Area Prompts in Gaming Machines," written by IGT, available prior to May 7, 2004.

* cited by examiner

GAMING DEVICE HAVING CHANGED OR GENERATED PLAYER STIMULI

PRIORITY CLAIM

This application is a continuation of and claims priority to and the benefit of U.S. patent application Ser. No. 09/686,244, filed Oct. 11, 2000, now U.S. Pat. No. 6,739,973, the entire disclosure of which is incorporated herein in its entirety.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device that enhances a player's interest, excitement, length of play and overall enjoyment of the gaming experience while operating the gaming device by changing or generating at least one stimulus presented to the player by the gaming device.

BACKGROUND OF THE INVENTION

Gaming devices in general are designed to attract a player to the device to offer a gaming experience, preferably over an extended period of time. Gaming devices generally attract players through the use of lights, colors, sounds, themes, awards, differing games and bonus games. Gaming devices also use video screens to increase a player's attraction to a game by offering more winning combinations. However, when a player plays such gaming devices, the gaming devices offer a repetitive gaming experience to the player (i.e., the game repeats the same individual or set of sounds, lights and other stimuli presented to the player.) This repetitive gaming experience is multiplied when a player repeatedly makes the same wager (as many players do) which consists of the same paylines or bet using a "repeat bet" button or a "max bet" button.

The player thereby constantly experiences the same audio, visual, audio-visual, or length of time stimuli of the gaming device. Known gaming devices which continually offer the same gaming experience in a repetitive fashion to the player causing the player to become lulled or bored while operating the gaming device. This in turn causes the player to lose interest in the gaming device.

Therefore, there is a need for a gaming device which enhances a player's interest, excitement, length of play and enjoyment of the gaming experience while repetitively playing a gaming device or repeatedly making the same wager or bet.

SUMMARY OF THE INVENTION

The present invention provides a gaming device which changes repetitive stimuli provided to a player when the player repeatedly plays the gaming device or repeatedly makes the same wager or bet to increase the player's interest, excitement, length of play, and overall enjoyment.

The present invention monitors and temporarily stores player activity, specifically the player's wagers or bets. When a predetermined or random number of the same bets or wagers are made, the gaming device changes or generates at least one stimulus provided to the player. The change or generation of at least one player stimulus can be subtle or not subtle, and can be done in a predetermined or random fashion. Alternatively, the gaming device of the present invention could be adapted to monitor and temporarily store a predetermined period of time a player operates the gaming device and could change or generate at least one player stimulus based upon that period of time.

It is therefore an object of the present invention to provide a gaming device having at least one changed or generated player stimuli to increase a player's interest, excitement, length of play, and enjoyment of the gaming experience while operating the gaming device.

Other objects, features and advantages of the invention will be apparent from the following detailed disclosure, taken in conjunction with the claims and accompanying sheets of drawings, wherein like numerals refer to like parts, elements, components, steps and processes.

DETAILED DESCRIPTION OF THE INVENTION

Gaming Device and Electronics

Figure 1A:
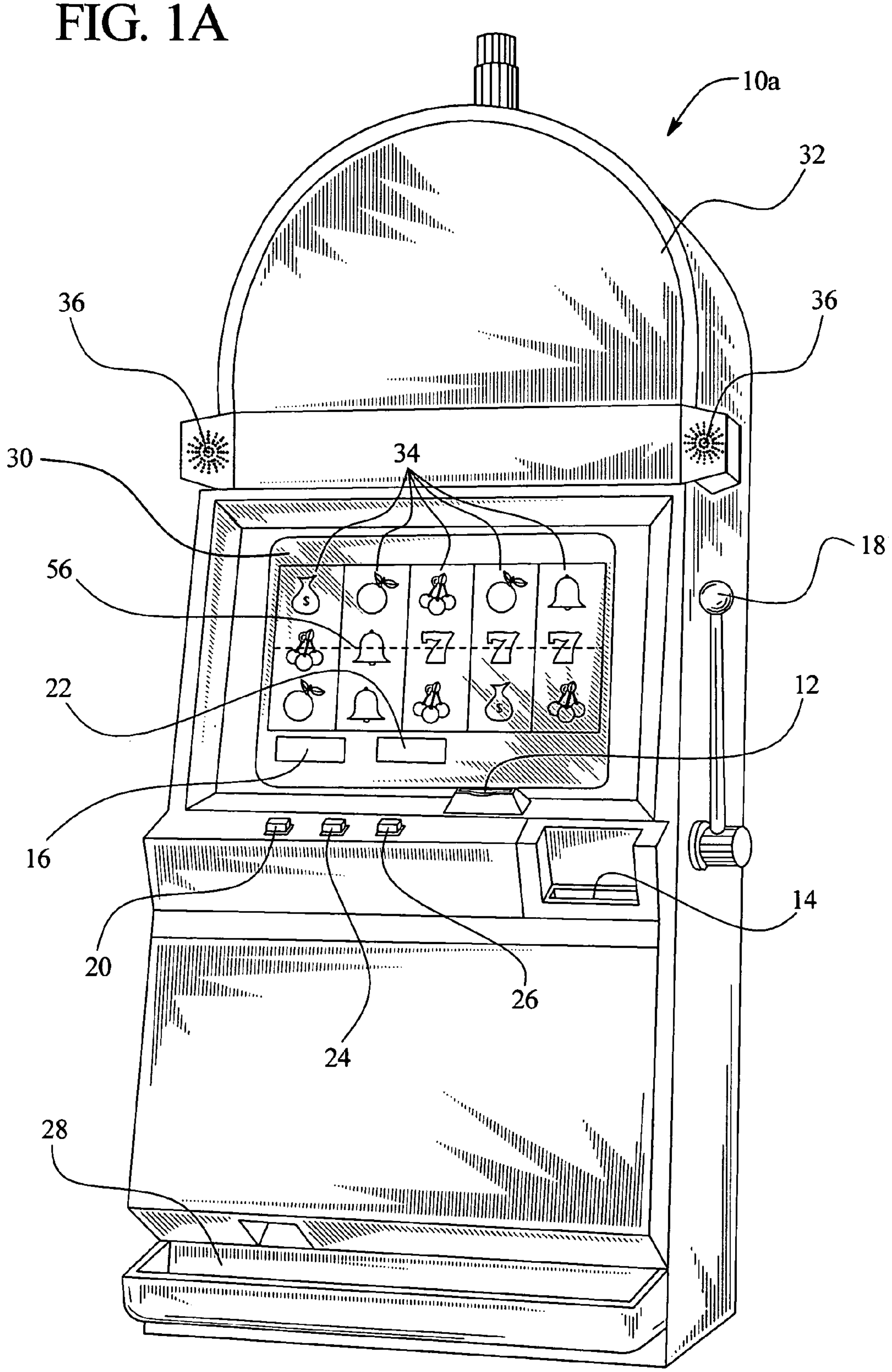
FIG. 1A is a front plan view of the general configuration of the gaming device of the present invention.
Figure 1B:
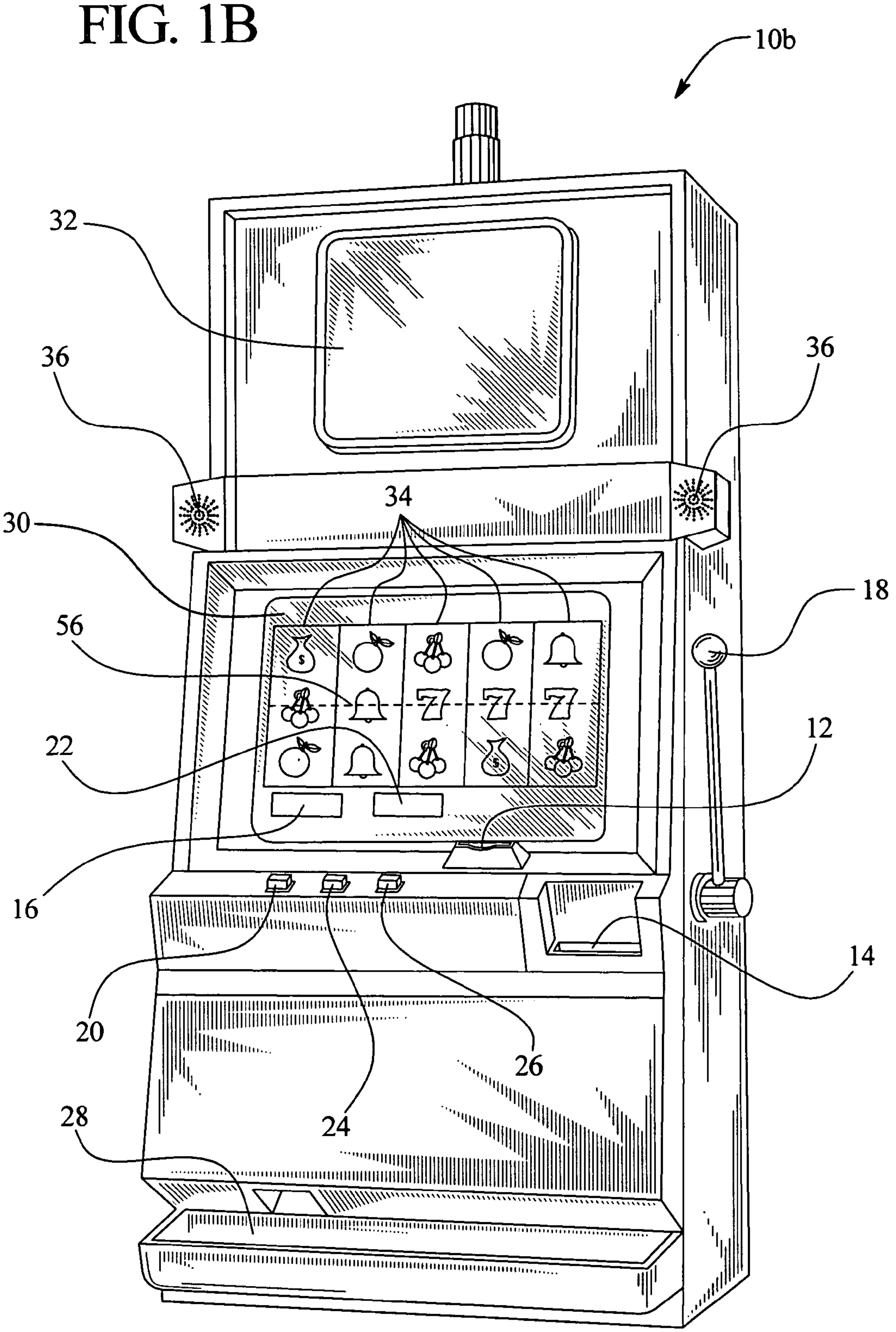
FIG. 1B is a front plan view of an alternative embodiment of the general configuration of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a handheld video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or a ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to, movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
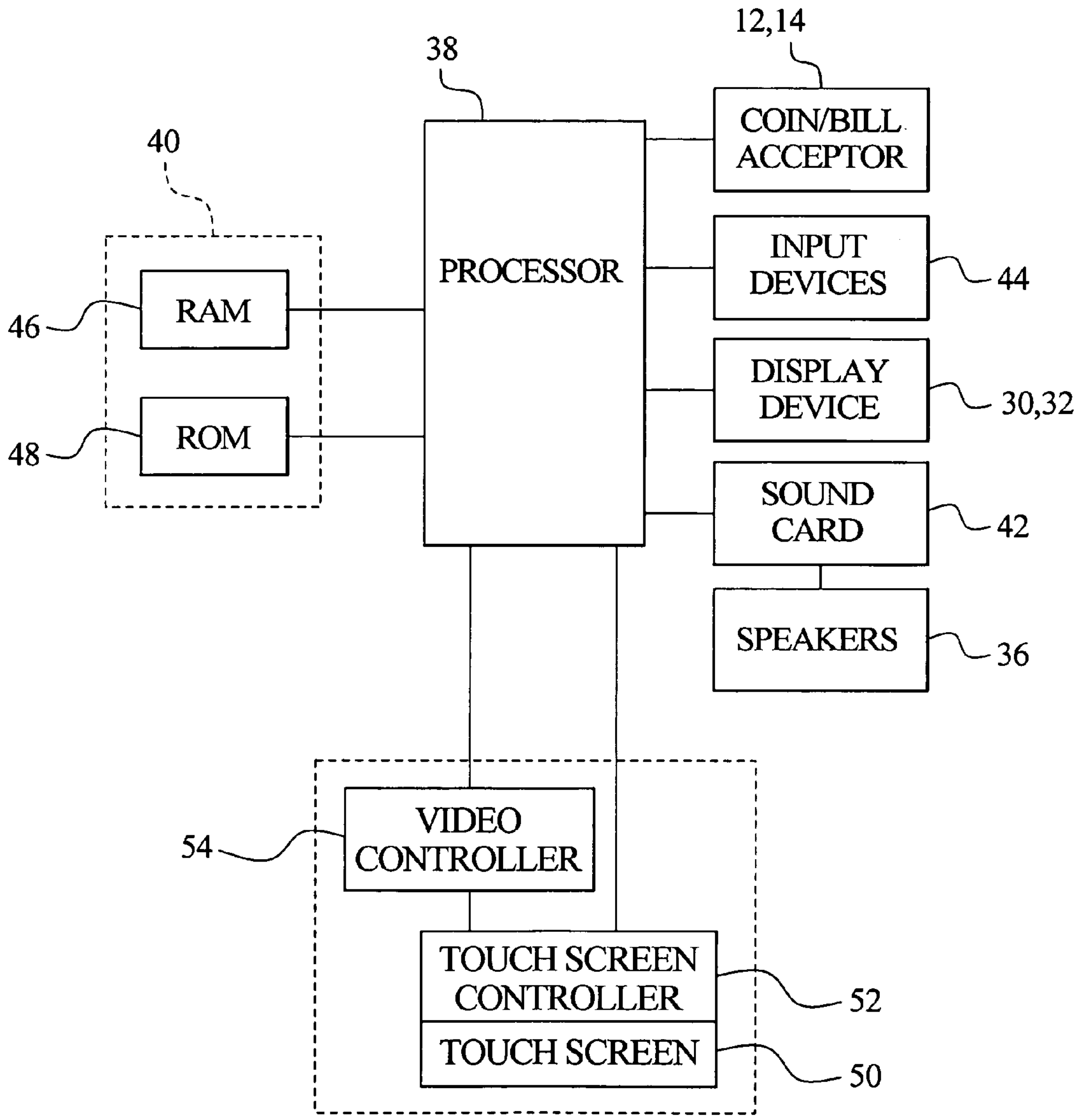
FIG. 2 is a schematic block diagram of the general electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances, it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 together are generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 may also provide players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof. The present invention may be employed in a primary, secondary or bonus game of a gaming machine.

Gaming Device Apparatus Having At Least One Changed or Generated Player Stimulus The present invention includes a gaming device 10 which enhances the interest, excitement, length of play, and enjoyment of the gaming experience for a player operating gaming device 10 by changing or generating at least one player stimulus after a predetermined or random number of wagers or bets has been inputted into gaming device 10 by the player. To do so, the gaming device 10 monitors and temporarily stores the player's wagers or bets which the player inputs into gaming device 10 using one or more of input devices 44 as can be seen in FIG. 2.

Based on the number of consecutive activations of input device 44, the gaming device 10 changes or generates at least one player stimuli after a predetermined or random number of those consecutive activations has been inputted into the gaming device. The changed or generated stimulus may be subtly or not subtly perceptible by the player and can be displayed or generated from gaming device 10 in a predetermined or random fashion. The player stimuli can include, but are not limited to, at least one changed or generated light, display, sound, and timing or speed of the gaming device. Thus, such player stimuli can be an auditory, visual, audio-visual, or length of time stimulus and combinations thereof.

Figure 3:
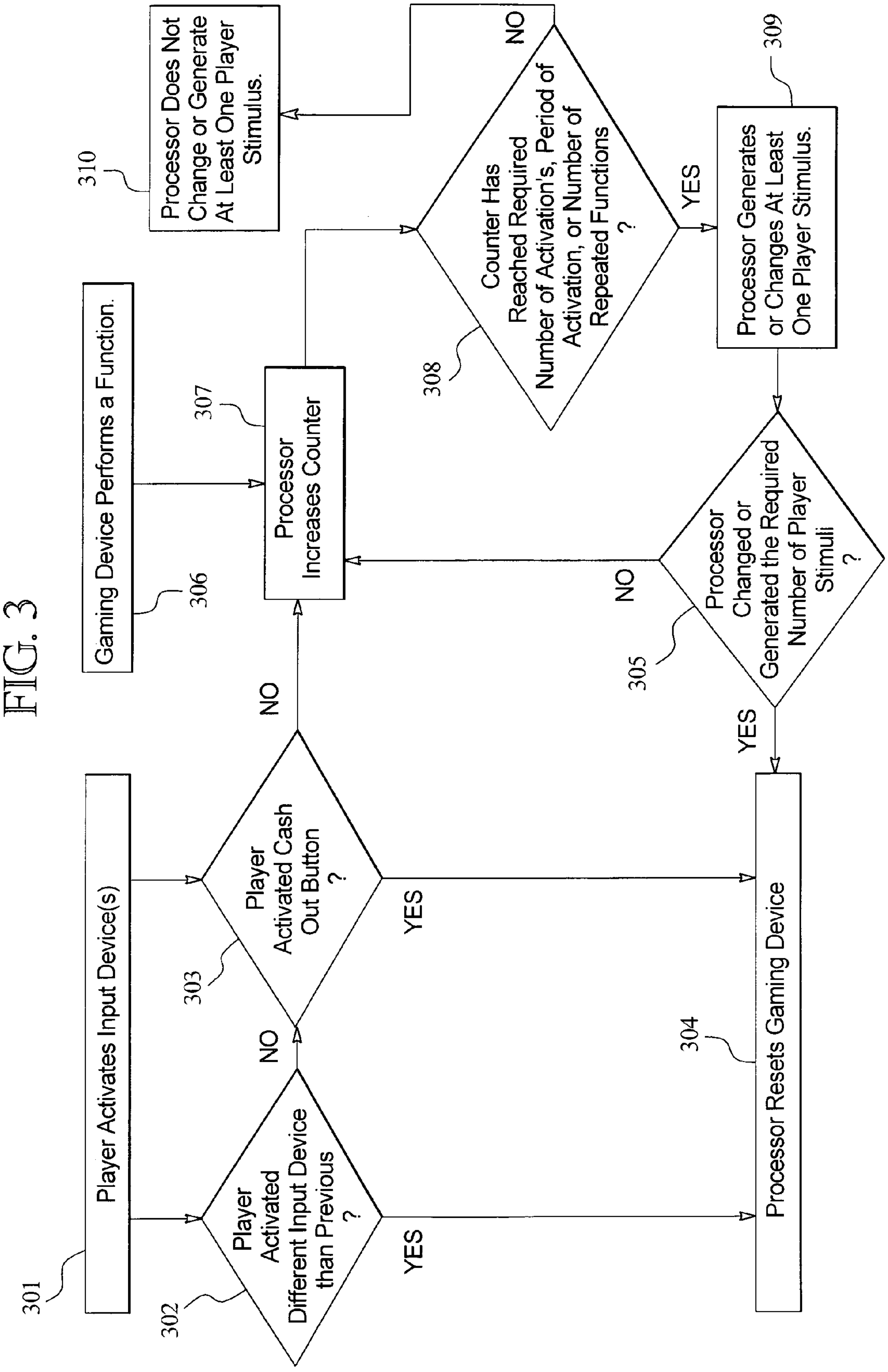
FIG. 3 is a flowchart illustrating the steps of operating the gaming device of the present invention.

In the preferred embodiment of gaming device 10, the gaming device resets itself when a reset mechanism such as the "cash out" button 26 is activated by the player. When the gaming device 10 is reset, the gaming device preferably defaults to the basic game stimuli. The general steps of operating gaming device 10 according to the principles of the present invention are illustrated via the flowchart of FIG. 3.

It should be appreciated that while the cash out button 26 is one preferred form of the reset mechanism within gaming device 10, other reset mechanisms could be employed within gaming device 10. Such mechanisms can include, but are not limited to, for instance, activation of at least one different input device 44 (FIG. 2) than immediately previously inputted by the player or a predetermined number of at least one of the changed or generated player stimuli occurring to subsequently trigger processor 38 to reset gaming device 10.

The input devices 44 are preferably monitored by gaming device 10 or via the controller and can include, but are not limited to: cash out button 26, play button 20, bet one button 24, bet max button 52, bet per line button 54, and at least one bet amount button 58. The gaming device can include other conventional input mechanisms such as a repeat bet button.

The predetermined number of consecutive activations of at least one type of input mechanism 44 inputted into gaming device 10 (which preferably ranges from about 10 activations to about 25 activations or greater, but can be one or more activations) causes processor 38 to change at least one player stimulus already provided to the player or to generate at least one different player stimulus. For example, if a player activates input device 44 in the form of bet max button 52 ten times, processor 38 monitoring and temporarily storing such activations in conjunction with memory device 40 changes or generates at least one player stimulus as a response to that number of activations equaling the predetermined number of activations required to cause activation of processor 38 and memory device 40.

Alternatively, if a first player were to activate input mechanism 44 in the form of bet max button 52 five times, such a number of activations being monitored and stored by processor 38 in conjunction with memory device 40 would not be equal to the predetermined number of activations i.e., ten, required to cause processor 38 and memory device 40 to change or generate at least one player stimulus or combinations thereof. Yet, if the first player or a subsequent player completes the required predetermined number of activations, then processor 38 would change or generate at least one audio, visual, audio-visual, or length of time stimulus as well as combinations thereof to enhance the player's excitement, interest, length of play, and enjoyment of the gaming experience while operating gaming device 10.

It should be appreciated by those skilled in the gaming device art, however, that the number of consecutive activations of at least one type of input device 44 required to cause processor 38 to change or generate at least one player stimuli can be a random number generated by the controller of gaming device 10 rather than some previously established predetermined number.

With respect to the changed or generated stimuli of the preferred embodiment, the stimuli can be at least one audio stimulus, visual stimulus, audio-visual stimulus, length of time stimulus, and combinations thereof. It should be appreciated by those skilled in the art that when gaming device 10 or processor 38 changes or generates at least one player stimulus, the change or generation of that stimulus can be done in a predetermined or random fashion.

For example, processor 38 once triggered by the predetermined or random number of activations inputted into gaming device 10 could first change an auditory stimulus and then a visual stimulus and continue that pattern of change in a predetermined fashion. Alternatively, processor 38 once triggered could randomly change or generate any of the player stimuli of gaming device 10 rather than doing so in some predetermined sequence or order.

It should be appreciated by one skilled in the gaming device art that the present invention contemplates changing or generating not just one stimulus via gaming device 10 or processor 38, but also a plurality of stimuli. Further, the present invention also contemplates that processor 38 can change or generate at least one audio, visual, audio-visual, length of time stimulus or combinations thereof at the same time or at different times.

Preferably, the auditory stimulus includes, but is not limited to, at least one of the following examples: a changed reel spin sound, a changed reel stop sound, a changed input mechanism activation sound, a changed audio clip generated by gaming device 10, a changed reel speed sound, and combinations thereof.

Preferably, the visual stimulus includes, but is not limited to, at least one of the following examples: a changed reel speed, a change in lighting of one or more reels 34, a changed lighting scheme of gaming device 10, a flashing light, an alternating light, a changed reel symbol, display of a static image, a changed display of a static image, display of a motion picture, changed display of a motion picture, and combinations thereof.

Preferably, the length of time stimulus is a shortened reel spin time or changed reel spin speed.

In an alternative embodiment of the present invention, gaming device 10 enhances the player's interest, excitement, length of play, and enjoyment of the gaming experience for an extended period of time by monitoring and temporarily storing player activations of at least one input device 44 during a period of time (preferably displayed upon display device 32 and activated through touch screen 50) to cause processor 38 to change or generate at least one player stimulus or combinations thereof upon display device 32 and/or generated from speakers 36 if a predetermined number of those activations occurs during that period of time. The input mechanisms, reset mechanisms, and stimuli of the preferred embodiment are equally applicable to this alternative embodiment.

The triggering event to cause processor 38 to change or generate at least one stimulus is the activation of at least one input device 44 for a predetermined period of time. Preferably, the predetermined period of time activating at least one input device 44 is about ten seconds or greater.

For example, a player of gaming device 10 activates input mechanism 44 in the form of bet one button 24 for a period of five minutes or greater. In doing so, processor 38 monitoring and temporarily storing such a period of activation in conjunction with memory device 40, recognizes that the predetermined period of activation has been reached and subsequently changes or generates at least one audio, visual, audio-visual, or length of time stimulus or combinations thereof.

In another alternative embodiment, the present invention contemplates that processor 38 in conjunction with memory device 10 is capable of monitoring and temporarily storing a combination of a number of activations and a period of activation for input device 44. In doing so, gaming device 10 can offer any player of the gaming device at least one changed or generated audio, visual, audio-visual, or length of time stimulus as well as combinations thereof at a varying rate based upon a variety of quantity and time combinations of input device 44 activation. Thus, this embodiment of gaming device 10 offers a large possible quantity of changeable gaming experiences for the player.

In further alternative embodiment, the present invention contemplates that input device 44 can be displayed as a mechanical push-button (as shown in FIGS. 1A and 1B) capable of being depressed to register as an activation, preferably by processor 38 and memory device 40. In doing so, this embodiment like the preferred embodiment changes or generates at least one audio, visual, audio-visual, or length of time stimulus as well as combinations thereof by processor 38 when the predetermined or random number of activations of mechanical input device 44 has been completed by a player.

In a still further alternative embodiment, the present invention contemplates that input device 44 can be displayed as a mechanical push-button (as shown in FIGS. 1A and 1B) capable of being depressed to preferably register within processor 38 and memory device 40 as a point in time when input device 44 has been activated. After at least one mechanical input device 44 has been activated for a predetermined period of time, processor 38 changes or generates at least one player stimulus or combinations thereof according to the objectives of the present invention.

In another alternative embodiment, the present invention also contemplates providing a plurality of reels having a plurality of input devices 44 as previously described such that by activating at least one input device 44 also activates another input device 44 as well. Such an embodiment enables the predetermined or random number of activations and/or the predetermined period of time of activation of at least one input device 44 to be reached at a faster rate so that a player may experience at least one changed or generated player stimulus or combinations thereof sooner during gaming play.

In still another alternative embodiment, the present invention contemplates that gaming device 10 can separately contain only one of the auditory, visual, audio-visual, or length of time stimuli to focus upon that particular type of stimulus. For example, gaming device 10 could only contain visual stimuli that would be generated by processor 38 rather than in combination with other auditory, auditory-visual, and length of time stimuli. However, it is preferable for the present invention, that gaming device 10 contain a plurality of auditory, visual, and length of time stimuli.

In yet another alternative embodiment, the present invention contemplates that gaming device 10 can display input device 44 in mechanical or video form and processor 38 can monitor and temporarily store the predetermined or random number of activations or alternatively the predetermined or random period of activation of input device 44 as a component of a base game format, bonus game format, or a combination of both.

As mentioned above, a bonus game is an award generating play of the game other than a combination of the reels giving an award initially. Thus, the predetermined or random number of activations or predetermined or random period of activation of input device 44 could be generated from a base game, a bonus game, or a combination of both to cause processor 38 to change or generate at least one audio, visual, audio-visual, or length of time stimulus as well as combinations thereof.

By allowing the present invention to occur in a base game, bonus game, or a combination thereof, a player has an increased opportunity to enjoy the enhanced gaming experience produced according to the objectives of the present invention.

In a further alternative embodiment of the present invention, at least one stimuli is changed or generated after the gaming device 10 (instead of the player) repeats a function a predetermined number of times. One embodiment of this alternative embodiment includes increasing the reel spin speed after the reels are automatically spun by gaming device 10 or processor 38 at least twice.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is hereby claimed as follows:

1. A gaming device comprising:

a plurality of different player stimuli;

a game operable upon a wager, said game having a plurality of different outcomes;

a display device operable to display the game to a player;

at least one input device operable to enable the player to initiate multiple consecutive plays of the game; and a processor operable with the display device and input device to:

(a) maintain a count of how many of the consecutive plays of the game occur;

(b) produce a same one of the player stimuli for a designated quantity of the consecutive plays of the game, the designated quantity being at least two; and (c) produce a different one of the player stimuli for one or more of the plays of the game that occur after the designated quantity is reached, the different stimulus produced independent of any of the outcomes of the plays of the game.

2. The gaming device of claim 1, which includes a plurality of computer-readable instructions executable by the processor to randomly determine the designated quantity.

3. The gaming device of claim 1, which includes at least one other input device operable to enable the player to cause the processor to provide any payout due to the player and reset the count.

4. The gaming device of claim 1, which includes a plurality of computer-readable instructions executable by the processor to reset the count when a designated event occurs.

5. The gaming device of claim 1, wherein the player stimuli includes a stimulus selected from the group consisting of an auditory stimulus, a visual stimulus, an audio-visual stimulus, a length of time stimulus and a combination of a plurality of said stimuli.

6. The gaming device of claim 1, wherein the processor is operable with the input device to enable a player to place a same wager in each of the designated quantity of consecutive plays of the game.

7. The gaming device of claim 1, wherein the processor is operable with the input device to enable a player to place a maximum wager in each of the designated quantity of consecutive plays of the game.

8. A method for operating a gaming device, the method comprising:

(a) providing a plurality of different player stimuli;

(b) providing a plurality of outcomes for a game operable upon a wager;

(c) enabling a player to initiate multiple consecutive plays of the game;

(d) maintaining a count of how many of the consecutive plays of the game occur;

(e) producing a same one of the player stimuli for a designated quantity of the consecutive plays of the game, the designated quantity being at least two; and (f) producing a different one of the player stimuli for one or more of the plays of the game that occur after the designated quantity is reached, the different stimulus produced independent of any of the outcomes of the plays of the game.

9. The method of claim 8, which includes randomly determining the designated quantity.

10. The method of claim 8, which includes enabling the player to receive any payout due to the player and reset the count.

11. The method of claim 8, which includes resetting the count when a designated event occurs.

12. The method of claim 8, wherein providing a plurality of different player stimuli includes providing a stimulus selected from the group consisting of an auditory stimulus, a visual stimulus, an audio-visual stimulus, a length of time stimulus and a combination of a plurality of said stimuli.

13. The method of claim 8, which includes enabling a player to place a same wager in each of the designated quantity of consecutive plays of the game.

14. The method of claim 8, which includes enabling a player to place a maximum wager in each of the designated quantity of consecutive plays of the game.

15. A method for operating a gaming device having a plurality of different player stimuli, the method comprising:

(a) enabling a player to provide funding to the gaming device;

(b) enabling the player to initiate multiple consecutive plays of a game operable upon a wager;

(c) causing at least one of a plurality of outcomes to occur in each of the plays of the game;

(d) maintaining a count of how many of the consecutive plays of the game occur;

(e) producing a same one of the player stimuli for a designated quantity of the consecutive plays, the designated quantity being at least two;

(f) producing a different one of the player stimuli for one or more of the plays of the game that occur after the designated quantity is reached, the different stimulus produced independent of any of the outcomes of the plays of the game;

(g) stopping the production of the different stimulus when the player cashes-out; and (h) providing any payout due to the player based on the funding provided by the player and the outcomes of the plays of the game.

16. The method of claim 15, wherein enabling a player to initiate multiple plays of the game includes enabling the player to place a plurality of wagers.

17. The method of claim 15, which includes resetting the count and repeating steps (a) through (h) at least once.

18. The method of claim 15, which includes randomly generating the designated quantity.

19. The method of claim 15, wherein the steps of producing one of the player stimuli and producing a different one of the player stimuli include producing a plurality of different player stimuli wherein each of said different player stimuli include a player stimulus selected from the group consisting of an auditory stimulus, a visual stimulus, an audio-visual stimulus, a length of time stimulus and a combination of a plurality of said stimuli.

20. The method of claim 19, which includes randomly determining the different player stimuli.

21. The method of claim 15, wherein the steps of producing one of the player stimuli and producing a different one of the player stimuli include producing a plurality of different audio or visual outputs.

22. The method of claim 15, which includes providing a plurality of games for the gaming device, each of the games enabling the player to initiate multiple consecutive plays of said game.

23. The method of claim 15, which includes enabling a player to place a same wager in each of the designated quantity of consecutive plays of the game.

24. The method of claim 15, which includes enabling a player to place a maximum wager in each of the designated quantity of consecutive plays of the game.

* * * * *